United States Patent [19]

Schoen

[11] Patent Number: 4,543,451
[45] Date of Patent: Sep. 24, 1985

[54] SEAT FOR A CORDLESS TELEPHONE

[75] Inventor: Siegfried Schoen, Starnberg, Fed. Rep. of Germany

[73] Assignee: Siemens Aktiengesellschaft, Berlin & Munich, Fed. Rep. of Germany

[21] Appl. No.: 589,954

[22] Filed: Mar. 15, 1984

[30] Foreign Application Priority Data

Mar. 18, 1983 [DE] Fed. Rep. of Germany ....... 3309877

[51] Int. Cl.⁴ .......................... H04Q 7/04; H04M 1/04
[52] U.S. Cl. .............................. 179/2 EA; 179/2 BC; 179/100 L; 179/179
[58] Field of Search .............................. 179/2 E-2 EC, 179/179, 153, 100 L, 100 C, 100 R, 100 D, 2 BC

[56] References Cited

U.S. PATENT DOCUMENTS 3,521,008 7/1970 Tyson .............................. 179/179 X
4,458,111 7/1984 Sugihara .......................... 179/2 EA

OTHER PUBLICATIONS

Hong Kong Household, p. 36, Oct., 1983.

Primary Examiner—Gene Z. Rubinson
Assistant Examiner—W. J. Brady
Attorney, Agent, or Firm—Hill, Van Santen, Steadman & Simpson

[57] ABSTRACT

A stationary station for seating a cordless telephone is designed to permit safe storage of the cordless telephone. A trough-like recess corresponding in shape to the shape of the cordless telephone is provided in the stationary station.

12 Claims, 1 Drawing Figure

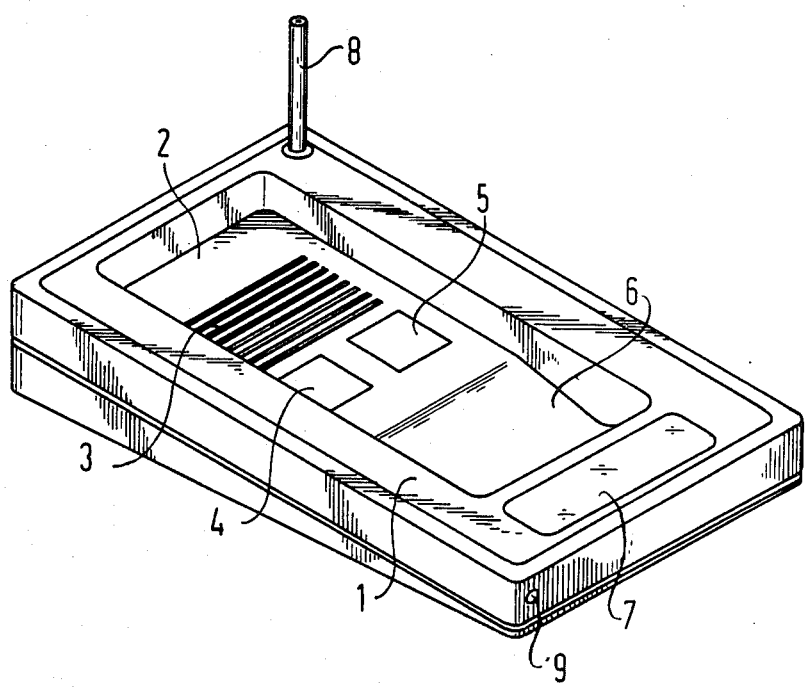

SEAT FOR A CORDLESS TELEPHONE

BACKGROUND OF THE INVENTION

The invention relates to a stationary station for seating a cordless telephone.

Stationary stations form the connecting element to a telephone network and provide a place for keeping the cordless telephone.

SUMMARY OF THE INVENTION

An object of the invention is to design a stationary station such that it will permit a safe storage of the cordless telephone.

This object is achieved since the station exhibits a trough-like depression corresponding in shape to the shape of the cordless telephone.

It is preferable if a substantial portion of the cordless telephone is received in the depression. Preferably a depth of the trough is sufficient to receive at least one-half a thickness of the cordless telephone so that more than half of the telephone is protected in the trough.

The cordless telephone can thus be deposited in the trough-like seat in problem-free fashion.

It can be preferable for optical and safety reasons that the trough exhibits a depth such that the cordless telephone projects only slightly above the surface of the station.

It can also be advantageous that the trough is designed with a sloping depression in the area facing the user.

When the telephone is placed in the trough, it is possible to remove the telephone from the trough in a simple manner by means of pressing on the telephone in the area of the depression so as to cause a pivoting action at an edge of the depression.

It can be advantageous for functional reasons if a loud speaker, microphone, and operating keys are positioned in the trough.

The loudspeaker as well as the microphone permit unencumbered speaking to a cordless telephone. The keys can be employed for an internal call.

It can be expedient that an optical indicator means, particularly a display, is positioned in the front area of the station. This display can, for example, provide information regarding the charging condition of the cordless telephone.

For producing the connection to the cordless telephone, it is preferable that the station is provided with a retractable antenna.

In order to enable recharging of the cordless telephone, it is expedient that the trough exhibits contact points by means of which contact to the charging contacts of the cordless telephone can be produced when the cordless telephone is in place.

It is advantageous that the contact points be resiliently designed in order to provide reliable contacting between the stationary station and the cordless telephone.

BRIEF DESCRIPTION OF THE DRAWINGS

The drawing shows a stationarily disposed station for seating a cordless telephone.

DESCRIPTION OF THE PREFERRED EMBODIMENTS

The station comprises a housing 1 that has a trough-shaped recess 2. The apertures 3 of a loudspeaker can be seen in the floor of the trough. Two keys 4, 5 that can serve for an internal call are also indicated. The front area of the trough is designed in a depressed and angled fashion as to form a depression 6. The telephone lying in the trough can be removed from the station by pressing down in the area of the trough, and particularly at a microphone or speaking end of the cordless telephone, since it is then pivoted at an apex of an angle adjacent the depression by the depth of the depression. A display 7 is positioned in the front area of the trough in order, for example, to monitor the charging condition of the cordless telephone. The station is equipped with a retractable antenna 8 as well as with a microphone 9.

Although various minor changes and modifications might be proposed by those skilled in the art, it will be understood that I wish to include within the claims of the patent warranted hereon all such changes and modifications as reasonably come within my contribution to the art.

I claim as my invention:

1. In a stationary station for seating a cordless telephone, wherein the improvement comprises a trough-like recess corresponding in shape to a shape of the cordless telephone, and wherein a loudspeaker, a microphone, and operating keys are positioned in the recess.

2. A stationary station according to claim 1 wherein the trough-like recess has a depth such that the cordless telephone projects only slightly above a top surface of the station.

3. A stationary station according to claim 1 wherein the recess is designed with an oblique depression in an area facing the user.

4. A stationary station according to claim 1 wherein an optical indicator means as a display is positioned in a front area of the station.

5. A stationary station according to claim 1 wherein the station is provided with a retractable antenna.

6. A stationary station according to claim 1 wherein the recess exhibits contact point means for contact with charging contacts of the cordless telephone when the cordless telephone is in place.

7. A stationary station according to claim 6 wherein the contact points are resilient.

8. A stationary station according to claim 1 wherein the trough-like recess has at one end thereof a depression shaped such that if a user presses on an end of the cordless telephone so as to deflect the same into the depression the cordless telephone may be more easily held for removal from the recess.

9. A stationary station according to claim 8 wherein the depression angles downwardly from a floor of the recess so as to form a pivot point at an apex of an angle created by an angled floor of the depression and a remaining floor of the recess to permit rocking of the cordless telephone at said angle during removal.

10. A stationary station according to claim 1 wherein the recess has a depth sufficient to receive at least one-half of a thickness of the cordless telephone so that more than half of the telephone is protected in the trough.

11. In a stationary station for seating a cordless telephone, wherein the improvement comprises: a trough-like recess corresponding in shape to a shape of the cordless telephone; key means for performing certain functions related to the cordless telephone being provided in a floor of the recess; an angled depression at one end of the recess sloping downwardly from remaining portions of the floor of the recess; and wherein the angled depression provides an angle means at an intersection of a floor portion of the recess and the depression for permitting a rocking action of the cordless telephone at an apex of said angle to ease in removal from the recess.

12. A stationary station according to claim 11 wherein the recess has a depth sufficient to receive approximately half of a thickness or depth of the cordless telephone so as to protect the same and securely retain it at the stationary station when not in use.

* * * * *